United States Patent
Kaneko et al.

(10) Patent No.: US 6,342,672 B1
(45) Date of Patent: *Jan. 29, 2002

(54) SUPERCONDUCTING LEAD WITH RECOVERABLE AND NONRECOVERABLE INSULATION

(75) Inventors: Norio Kaneko, Atsugi; Tamaki Kobayashi, Isehara, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/385,976

(22) Filed: Feb. 9, 1995

(30) Foreign Application Priority Data

| Feb. 14, 1994 | (JP) | 6-017120 |
| Mar. 25, 1994 | (JP) | 6-077796 |

(51) Int. Cl.$^7$ ............................................. H01B 12/00
(52) U.S. Cl. ................................. 174/15.5; 174/125.1
(58) Field of Search ........................... 174/125.1, 15.4, 174/15.5; 336/216; 505/220, 230, 875

(56) References Cited

U.S. PATENT DOCUMENTS

| 3,713,211 A | * | 1/1973 | Freeman, Jr. ............... 29/599 |
| 4,394,634 A | | 7/1983 | Vansant ...................... 335/216 |
| 4,625,193 A | | 11/1986 | Purcell ....................... 335/216 |
| 4,910,626 A | | 3/1990 | Collet et al. .................. 361/19 |
| 5,246,729 A | * | 9/1993 | Gupta et al. .................. 427/62 |

FOREIGN PATENT DOCUMENTS

| EP | 0336337 | 10/1989 | | |
| GB | 2155244 | 9/1985 | | |
| JP | 55-146910 | * 11/1980 | | |
| JP | 62-213286 | * 9/1987 | | |
| JP | 1-61100 | * 3/1989 | ............... | 505/885 |
| JP | 1-64273 | * 3/1989 | | |
| JP | 2237413 | * 9/1990 | ............... | 174/15.4 |
| JP | 3283678 | 12/1991 | | |
| JP | 4320305 | 11/1992 | | |
| JP | 4369875 | 12/1992 | | |
| WO | WO9222915 | 12/1992 | | |

OTHER PUBLICATIONS

N.G. Anishchenko, et al., "High Voltage Heavy Current Leads for Liquid Helium Cryostats", Cryogenics, vol. 22, No. 11, pp. 609–613 (1982).

* cited by examiner

Primary Examiner—K. Cuneo
(74) Attorney, Agent, or Firm—Fitzpatrick, Cella, Harper & Scinto

(57) ABSTRACT

A superconducting apparatus includes a cryogenic chamber, superconducting equipment contained in the cryogenic chamber and a lead secured to the cryogenic chamber and connected to the superconducting equipment. A structured member for a prevention of an electric discharge is provided between the lead and an area for securing the lead of the cryogenic chamber. The structured member for the prevention of electric discharge may be a laminate of a conducting layer and a insulating layer having recoverable and non-recoverable insulation, and have an effect of shielding the corresponding lead from electromagnetic noises.

11 Claims, 10 Drawing Sheets

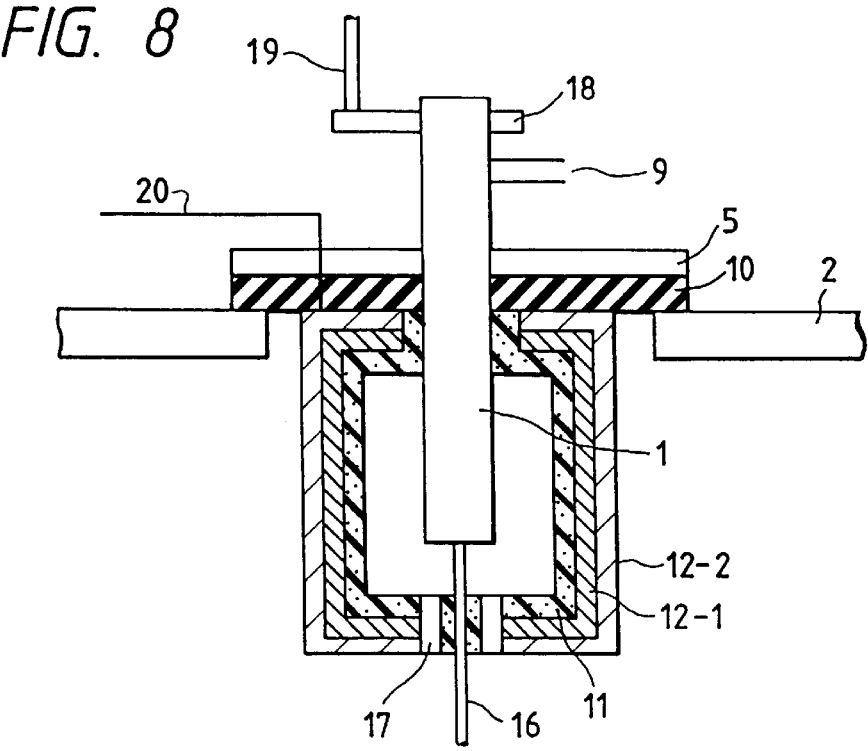
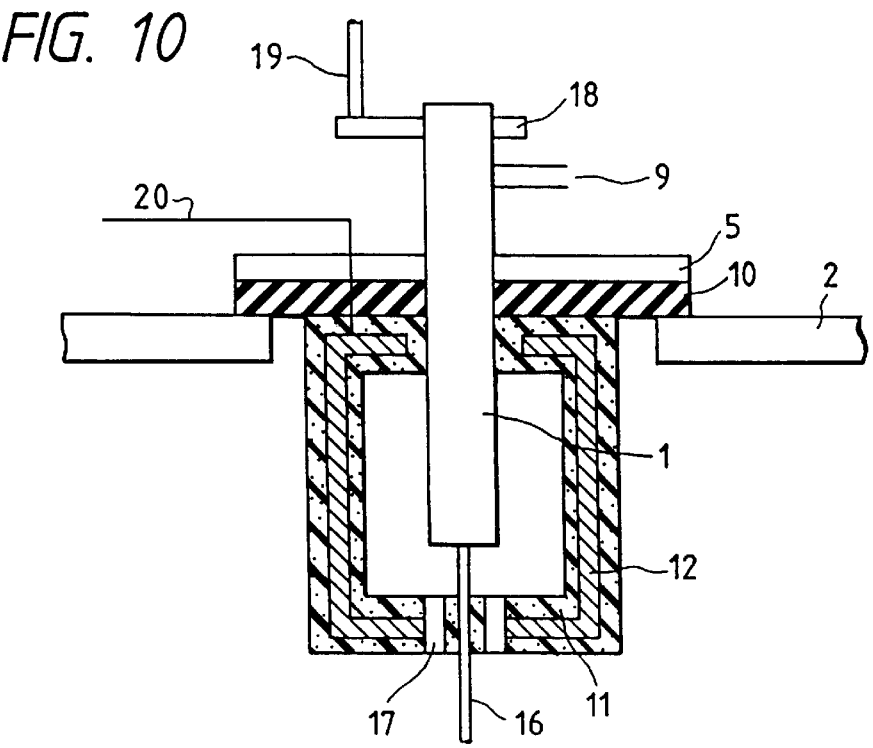

SUPERCONDUCTING LEAD WITH RECOVERABLE AND NONRECOVERABLE INSULATION

BACKGROUND OF THE INVENTION

1. Field of the Invention

This invention relates to a superconducting apparatus comprising a cryogenic chamber for storing superconducting equipment provided with superconducting magnets and/or Josephson devices etc. and, more particularly, it relates to a superconducting apparatus capable of improving the withstand voltage in peripheral areas of the leads for feeding the superconducting equipment with power from an external power source and shutting off various electromagnetic noises.

2. Related Background Art

FIG. 16 of the accompanying drawings shows a schematic sectional view of a conventional superconducting apparatus comprising a cryogenic chamber containing a superconducting magnet. Referring to FIG. 16, the apparatus comprises a superconducting coil 3 and a pair of leads 1 secured to a cryogenic chamber 2 by means of a respective fitting flanges 5. The fitting flanges 5 are typically made of metal and secured to the cryogenic chamber 2 with insulators 10 interposed therebetween. Reference numeral 4 denotes a cooling agent for cooling the superconducting coil 3. Liquid helium is typically used as the cooling agent 4 and evaporated helium gas cools down the conductors of the leads and then fed out of the cryogenic chamber by way of gas outlets 9. FIGS. 15A and 15B of the accompanying drawings respectively show in schematic cross section a longitudinal view and a plan view of a lead adapted for used with a superconducting apparatus of the type under consideration. In FIGS. 15A and 15B, the lead is housed in a hollow tube 24 covered by an insulating outer layer 25 and comprises a number of conductors 27 for electrically feeding the superconducting coil. Note that FIG. 15B is a cross sectional view taken along line C–C' in FIG. 15A.

A conventional superconducting apparatus as described above and illustrated in FIG. 16 has a space 6 in each area of the cryogenic chamber 2 provided for securing a lead to the cryogenic chamber and the space is filled with helium gas. As the superconducting coil is fed with power coming from an external power source via the leads, a high electric field is produced near each of the fitting flanges 5 particularly when an alternating current is used. Since helium gas is a relative poor insulator if compared with air, electric discharges can take place between each of the leads and the corresponding fitting flange through the space 6 surrounding the lead.

The lead and the fitting flange have to be separated from each other by a large distance for electric insulation. This by turn requires a large cryogenic chamber if the superconducting apparatus is to operate stably, making it difficult to down-size the superconducting apparatus comprising such a cryogenic chamber.

Additionally, while each of the leads of a superconducting apparatus comprising a number of conductors 27 is peripherally covered by an insulating layer 25 as shown in FIGS. 15A and 15B, it will be removed from the apparatus whenever necessary and put back to the apparatus again. In view of the convenience with which the operation of removing a lead from and putting it back to the apparatus is carried out, the insulating layer 25 cannot be made too thick and therefore the space 6 cannot be reduced significantly by increasing the thickness of the insulating layer 25 of the lead.

Japanese Patent Application Laid-Open No. 04-320305 proposes an improved superconducting apparatus provided with reduced spaces in areas for securing leads to a cryogenic chamber. The proposed apparatus shows a raised withstand voltage at each area for securing a lead to the cryogenic chamber as a highly insulating gas such as dry air or nitrogen is made to flow through the space surrounding the lead. However, such an apparatus requires an additional device for supplying gas and a specific arrangement has to be made to remove moisture from the gas. Thus, while the proposed apparatus has reduced spaces in areas for securing leads to a cryogenic chamber, it is additionally provided with a device for keeping a gas flow inside the cryogenic chamber and hence it is not significantly down-sized.

The leads of a superconducting apparatus of the type under consideration are required to prohibit intrusion of external heat in addition to its role of feeding power from an external power source. However, since leads are normally made of a metal that is thermally as well as electrically conductive, they can transmit not only electric power but also external heat into the superconducting equipments. A proposed solution to this problem is the use for leads of an oxide superconductor having a low thermal conductivity and no electric resistance. For instance, Japanese Patent Application Laid-Open No. 03-283678 discloses a lead realized by fitting oxide superconductors to a mechanically strong metal core and Japanese Patent Application Laid-Open No. 04-369875 teaches the connection of the oxide superconductor to provide the conductors of a lead. Leads of an superconductor oxide are effective for preventing external heat from entering the cryogenic chamber of a superconducting apparatus because the oxide has a very low thermal conductivity.

However, oxide superconductors are accompanied by a problem that the rate of electric current running therethrough can be remarkably reduced if subjected to an external magnetic field (FIG. 17). Note that a current density as high as about 10,000 A/cm$^2$ is normally required for a superconducting magnet. Thus, while leads realized by using oxide superconductors as a conductor can effectively prevent external heat from entering the cryogenic chamber of a superconducting apparatus, the rate of electric current at which power is fed to the superconducting equipment housed in the cryogenic chamber fluctuates to such an extent that the superconductivity of the equipment becomes totally impaired if an external magnetic field is applied thereto. Particularly if the superconducting equipment comprises a superconducting magnet, the effect of a leaky magnetic field that can be produced by the magnet will constitute a serious problem.

In order for a superconducting apparatus as illustrated in FIG. 16 to operate properly, it is important that not only the superconducting equipment and other components of the apparatus are reliable but also sufficient measures are taken to protect them against electric discharges and electromagnetic noises that can be generated in and near the areas where leads are secured thereto when the superconducting equipment is operated. Existing conventional superconducting apparatuses are, however, not sufficiently protected against discharges and noises and may require additional measures for protection. Furthermore, where a superconducting apparatus comprises a superconducting magnet that requires power to be supplied at an enhanced rate, any trouble on the part of the leads of the apparatus results in a non-operational condition of the superconducting equipment. While abnormal conditions on the part of the leads of a conventional apparatus are detected by measuring the voltage at the opposite ends of each conductor particularly when they are carrying an electric current, such a technique is of no use for protection against electric discharges that may occur between the leads and the cryogenic chamber.

SUMMARY OF THE INVENTION

It is therefore the object of the present invention to provide a down-sized superconducting apparatus provided with means for effectively preventing electric discharges in areas for securing leads to the apparaus without using any additional devices and preferably also provided with means for preventing noises so that the leads may operate in a stable manner.

According to the invention, the above object is achieved by providing a superconducting apparatus comprising a cryogenic chamber, a superconducting equipment contained in the cryogenic chamber and a lead secured to the cryogenic chamber and connected to the superconducting equipment, characterized in that a structured member for a prevention of an electric discharge is provided between the lead and an area for securing the lead of the cryogenic chamber.

Preferably, the structured member for the prevention of electric discharge may be a laminate of a conducting layer and an insulating layer.

Preferably, the structured member for the prevention of electric discharge may have an effect of shielding the corresponding lead from electromagnetic noises.

If the structured member for the prevention of electric discharge is a laminate of a conducting layer and an insulating layer, the conducting layer may preferably contain a magnetic substance.

BRIEF DESCRIPTION OF THE DRAWINGS

FIGS. 1, 2, 3, 4, 8, 10, 11 and 12 are schematic sectional partial views of so many different embodiments of superconducting apparatus according to the invention showing only an area of the apparatus provided for securing a lead to the cryogenic chamber.

DETAILED DESCRIPTION OF THE PREFERRED EMBODIMENTS

Figure 1:
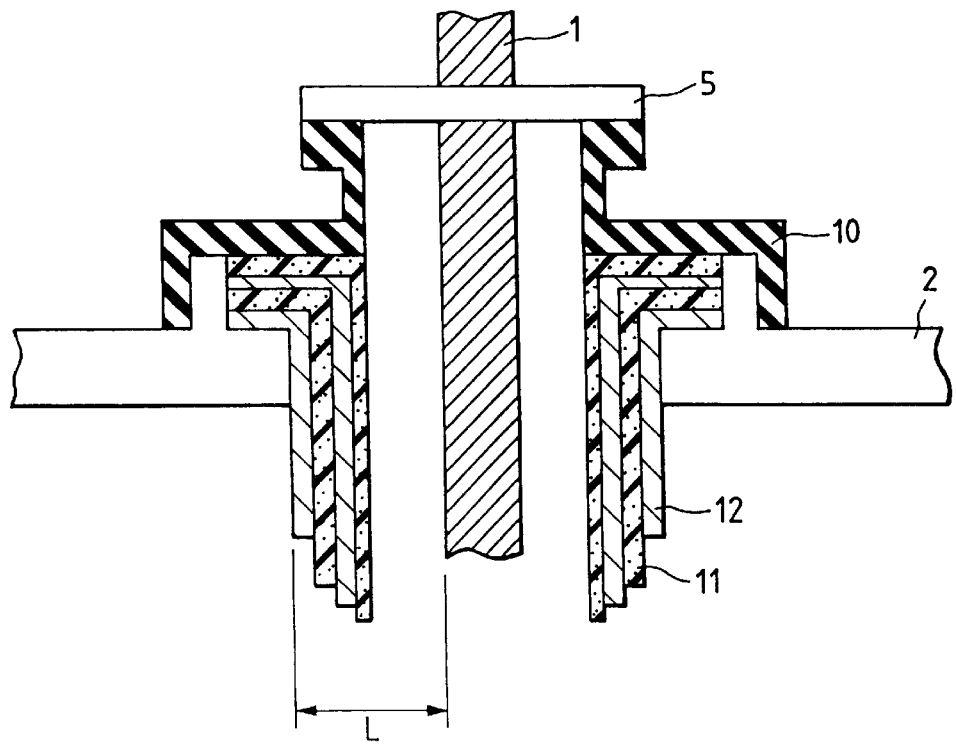
Figure 16:
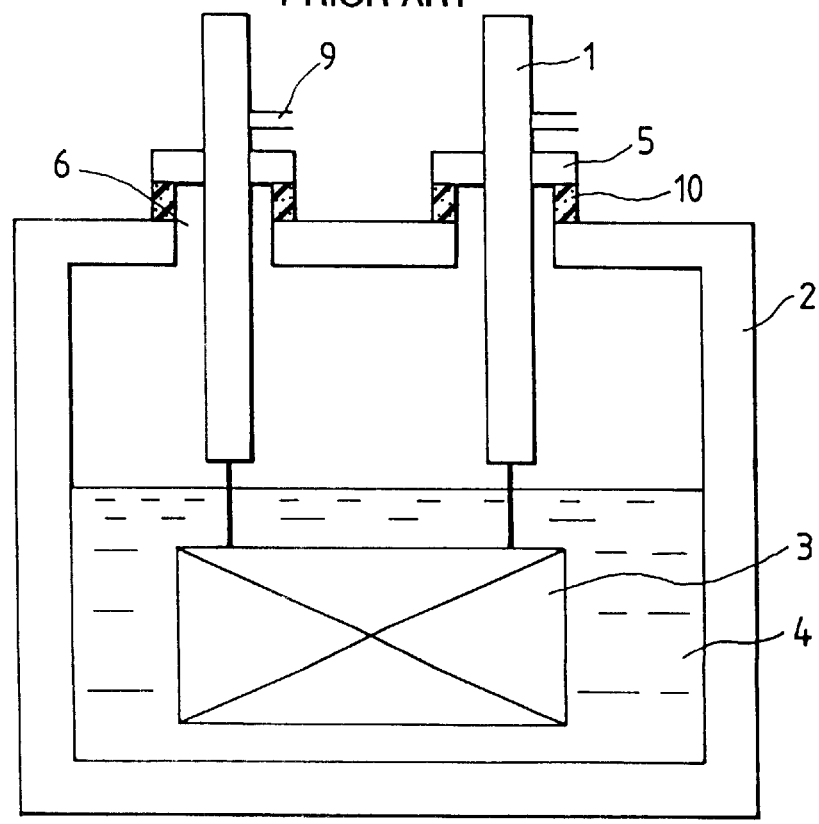
FIG. 16 is a schematic sectional view of a conventional Superconducting apparatus.

FIG. 1 schematically illustrates in cross section a preferred embodiment of superconducting apparatus according to the invention, showing only an area of the apparatus provided for securing a lead to the cryogenic chamber because otherwise the apparatus essentially has a configuration similar to that of FIG. 16. Note that the apparatus comprises a pair of leads, of which only one is shown in FIG. 16. Referring to FIG. 1, there are shown a lead 1, a flange for securing the lead 1 to the cryogenic chamber 2 of the apparatus by way of an insulating flange 10. Reference numerals 11 and 12 respectively denotes an insulating layer and a conducting layer and it is seen from FIG. 1 that two insulating layers and two conducting layers are arranged for a single lead. L denotes the shortest distance separating the lead and the cryogenic chamber.

Two types of insulating materials are known, non-recoverable type and recoverable type. Materials of the non-recoverable type totally or significantly lose the insulating property forever once subjected to dielectric breakdown, whereas those of the recoverable type can regain the property if they once lose it. While an article made of a non-recoverable type insulating material shows a relatively high withstand voltage, it has to be replaced once an electric current runs therethrough because it loses the insulating property and never recover it unless it is replaced by a new one. On the other hand, although an insulator made of a recoverable type insulating material shows a relatively low withstand voltage if compared with its non-recoverable type counterpart, it can regain the insulating property unless it is subjected to dielectric breakdown for a prolonged period of time. In view of this characteristic property of recoverable type insulating materials, the insulators used in a superconducting apparatus according to the invention are totally or partly made of a recoverable type insulating material in order to make it unnecessary to replace any insulators subjected to an electric discharge. Additionally, for the purpose of the present invention, either the electric potential of the conducting layers of the laminates is made equal to that of the cryogenic chamber or the conducting layers are grounded independently from the cryogenic chamber in order to eliminate any possible electric discharges between the insulators and the cryogenic chamber. Still additionally, if, for the purpose of the invention, the insulating layers of a superconducting apparatus contain a magnetic substance, the conductors of the leads can be protected from external leaky electric fields and other noises so that the superconducting equipment of the apparatus may enjoy stable operation.

Electric discharges can take place between the leads and the conducting members of the cryogenic chamber that are located close to the leads. In view of this observation, all the portions of the cryogenic chamber located vis-a-vis the leads are covered by an insulating material in a superconducting apparatus according to the invention. Thus, if electric discharges occur, they all come from the surface of the related insulators, requiring a high discharge initiating voltage.

Recoverable type insulating materials that can be used for the purpose of the invention include but not limited to yttrium oxide ($Y_2O_3$), whereas non-recoverable type insulating materials that can be used for an apparatus according to the invention include but not limited to alumina ($Al_2O_3$). The insulating layers may be made of only a recoverable type insulating material, if the superconducting apparatus is of a type that comprises one or more than one Josephson devices and consumes energy only at a low rate. On the other hand, however, if the apparatus comprises one or more large pieces of equipment such as AC superconducting magnets and consumes energy at an enhanced rate, the use of both recoverable type and non-recoverable type insulating materials is preferable. When insulating materials of different types are used, they may be used either as a mixture or for different layers. On the other hand, the conducting layers are made of either or both of a conducting material and a magnetic material. Materials that can be used for the conducting layers of an apparatus according to the invention include but not limited to stainless steel, copper, permalloy and various superconducting substances. For the purpose of the present invention, the insulating and conducting layers are required only to show a mechanical strength with which the laminates thereof can remain undamaged so long as they are handled in an ordinary manner. They may be manufactured by any appropriate method.

Figure 17:
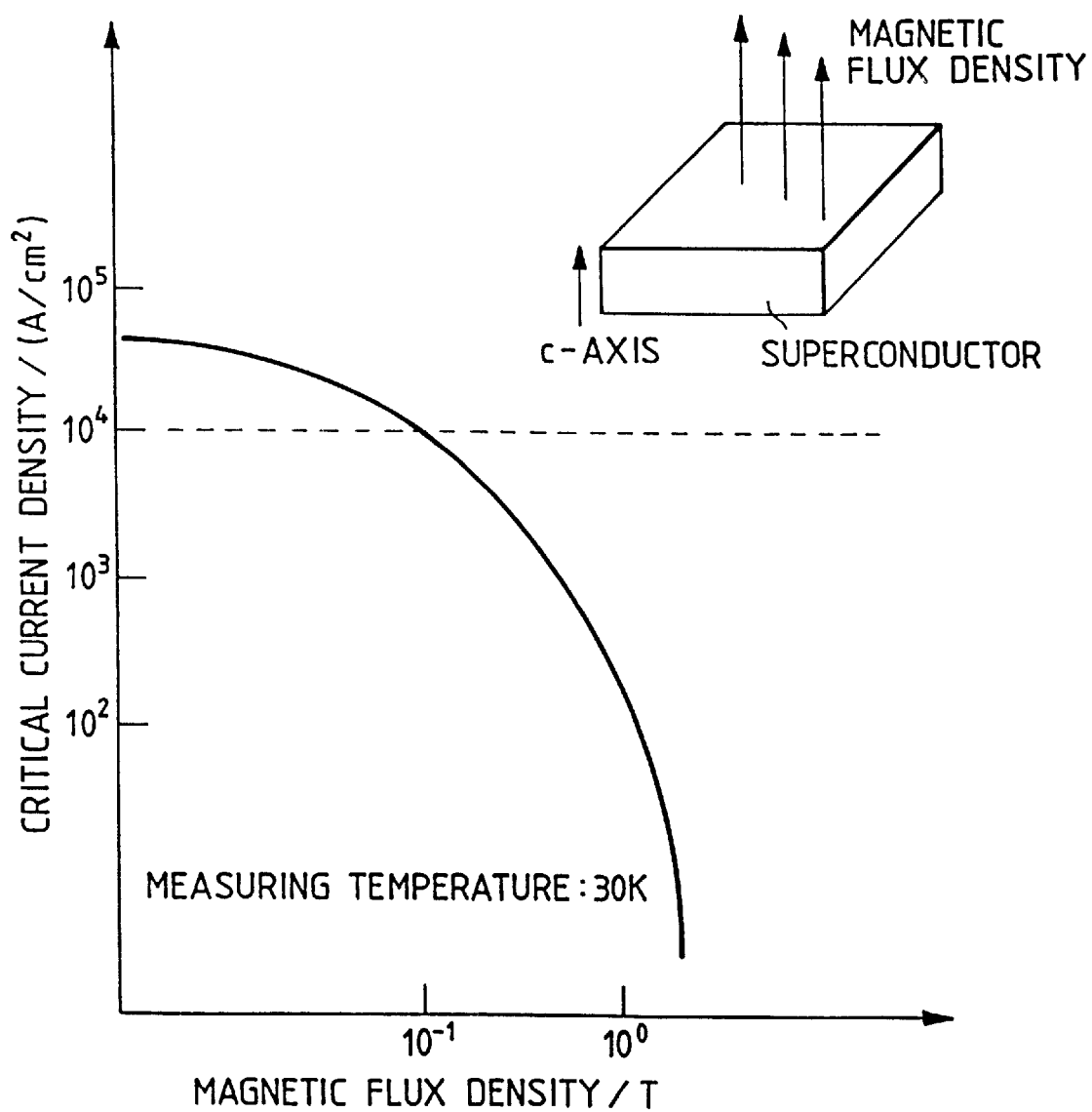
FIG. 17 is a graph showing the relationship between the critical current density and the magnetic flux density of an oxide superconductor.

The conductors of the leads of an apparatus according to the invention may be realized by using a superconductive oxide that become superconductive at a temperature higher than the boiling point of liquid nitrogen. Bi type superconductive oxides are typical examples of such materials. Since such superconducting materials show a thermal conductivity lower than that of copper or some other metal, they can effectively prevent external heat from entering the superconducting equipment of the apparatus. However, it is known that the rate at which an oxide superconductor can carry an electric current is strongly affected by external magnetic fields applied thereto and Bi type oxide superconductors show a remarkable reduction in the rate of the electric current running therethrough when the temperature rises above about 30K (FIG. 17). In order to avoid such a problem, a structured member which is a laminate of insulating layers and conducting layers is arranged around each of the leads as shown in FIG. 10 so that the conducting layers may shield the lead from electromagnetic noises.

Figure 13A:
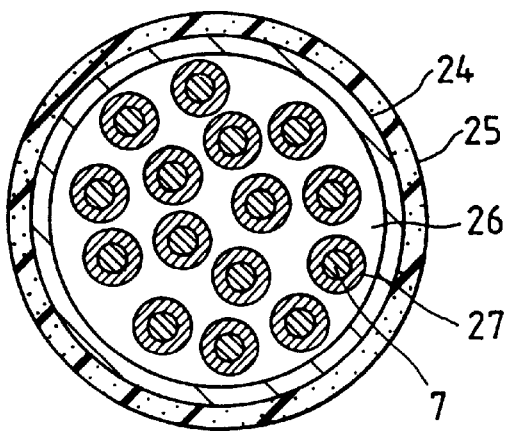
FIGS. 13A, 13B and 14 are schematic sectional views of so many different conventional leads to be used for superconducting apparatus.
Figure 13B:
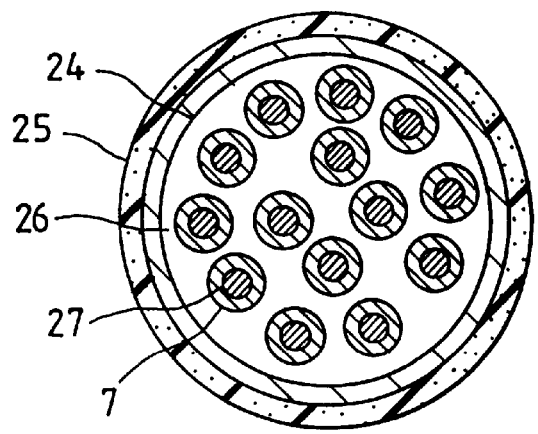
Figure 14:
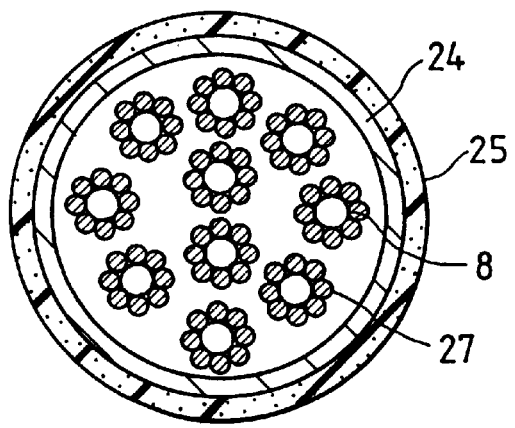
Figure 15A:
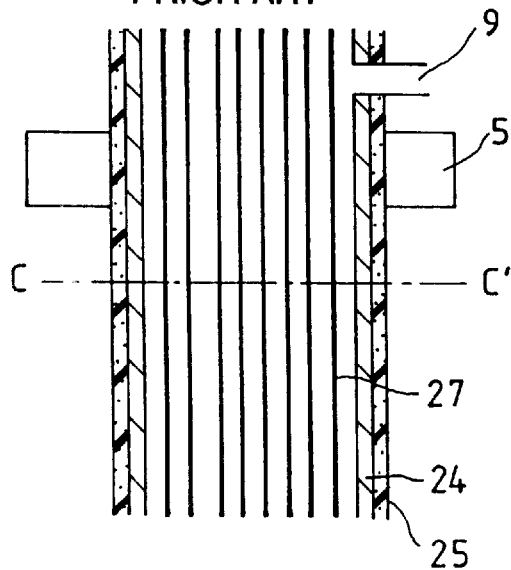
FIGS. 15A and 15B are respectively schematic longitudinal and lateral sectional views of a conventional led to be used for a superconducting apparatus.
Figure 15B:
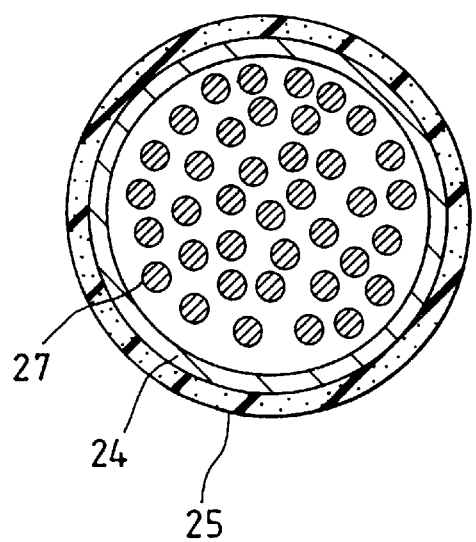

If a superconducting apparatus according to the invention comprises one or more than one superconducting magnets and hence consumes energy at an enhanced rate, it may preferably be provided with conductors that can detect electric discharges and other abnormal conditions that may take place in either of the leads when they are carrying electric currents. In order to accommodate the instance, part or all of the conductors of each of the leads may be realized by combining a superconductor and a light transmitting material as schematically shown in FIGS. 13A, 13B and 14. The light transmitting material becomes deformed to change the rate at which it transmits light when any of the superconductors are subjected to an external electric field or mechanical force. Therefore, any abnormal conditions on the part of the superconductors can be detected, eliminating any possible effects of disturbing electric phenomena that may take place there, by constantly observing the rate of light transmission of the light transmitting material by some optical means.

[Embodiments]

Now, the present invention will be described in greater detail by way of embodiments. While yttrium oxide and alumina are used respectively as recoverable type and non-recoverable type insulating materials in the following embodiments, it should be noted that the present invention is not limited thereto.

[Embodiment 1]

FIG. 1 schematically illustrates one of the areas of a first embodiment of superconducting apparatus where leads are secured to the apparatus. The embodiment has a configuration basically similar to that of a conventional apparatus illustrated in FIG. 16 and comprises a pair of leads for externally supplying power superconducting equipment and a cryogenic chamber containing the superconducting equipment and a cooling agent for cooling the superconducting equipment. If necessary, meters may be arranged at the opposite ends of the leads and those of the superconducting magnets when the superconducting equipment comprises such magnets. The cryogenic chamber may contain a plurality of pieces of superconducting equipment.

Referring to FIG. 1, there is shown only one of the leads 1, 1, which is secured to the cryogenic chamber 2 by means of a flange 5 with an insulating flange 10 disposed therebetween. A structured member is arranged around the lead 1 and comprises insulating layers 11, 11 prepared by mixing $Al_2O_3$ and $Y_2O_3$ to a ratio of 100 to 10, compression molding the mixture into layers by CIP and heat-treating them at 500° C. for five hours in the air and conducting layers 12, 12 of copper (Cu) formed on the outer peripheral surfaces of the respective insulating layers 11, 11 by flame coating, the conducting layer 12 being held in direct contact with the cryogenic chamber 2. Note that the insulating layers 11, 11 and the conducting layers 12, 12 are longitudinally so arranged that they are made longer as they are placed closer to the lead and that the lower end of the innermost insulating layer that directly faces the lead is located below the lower end, or the end closer to the superconducting equipment, of the lead. For simplicity, bolts and other tools for securing the lead and the structured member to the cryogenic chamber are omitted in FIG. 1.

By arranging a structured member comprising layers 11, 11 and 12, 12 between the cryogenic chamber and the lead, the components susceptible of electric discharges from the lead are protected by an insulating layer to minimize the possibility of occurrence of electric discharges.

Additionally, since a recoverable type insulating material has a withstand voltage lower than that of a non-recoverable type insulating material, dielectric breakdown can be limited to the recoverable type insulating material of the insulating layers if an electric discharge occurs. Any electric current generated by the electric discharge is then drawn out of the apparatus through the conducting layers 12, 12 and the earthing terminal (not shown) of the cryogenic chamber into the ground. Since an electric discharge continues for only a short period of time, the damaged recoverable type insulating material of the insulating layers 11, 11 can regain its insulating property.

Figure 5:
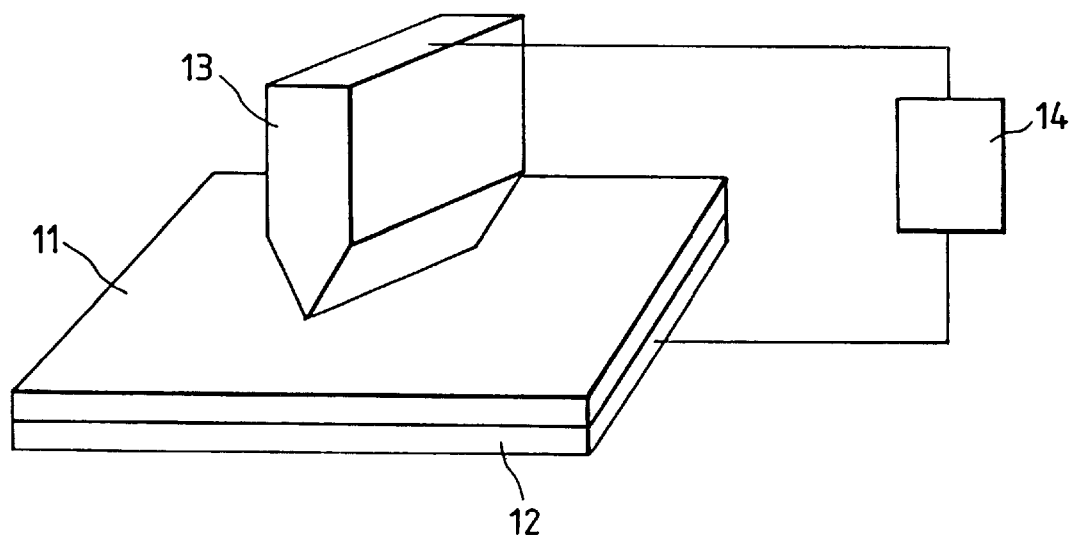
FIGS. 5, 6, 7A, 7B and 9 are so many different schematic views showing the arrangement of a gauging system for determining the effectiveness of the present invention.

In an experiment using a gauging system as schematically illustrated in FIG. 5, the effectiveness of a structured member comprising an insulating layer 11 and a conducting layer 12 was examined. While each of the insulating layers of the structure member of FIG. 1 is 1 mm thick, the insulating layer 11 of the structured member of FIG. 5 was polished to a thickness of 50 $\mu$m although it was made of the substances same as those of the insulating layers of FIG. 1. The conducting layer 12 of Cu of the structured member of FIG. 5 had a thickness of 70 $\mu$m, which is same as that of the conducting layers of FIG. 1. The structured member was 5 mm wide and 20 mm long. The Cu layer 12 was grounded although not shown in FIG. 5. Reference numeral 13 denotes a 15 mm wide tungsten block, which was tapered in order to make it liable to discharge electricity. A variable voltage up to 10 kV was applied to the tungsten block 13 by means of a power source 14 to generate electric discharges and the electric resistance of the insulating material 11 was determined before and after the electric discharges. When gauged with a tester, it did not carry any electric current before the electric discharges.

Figure 6:
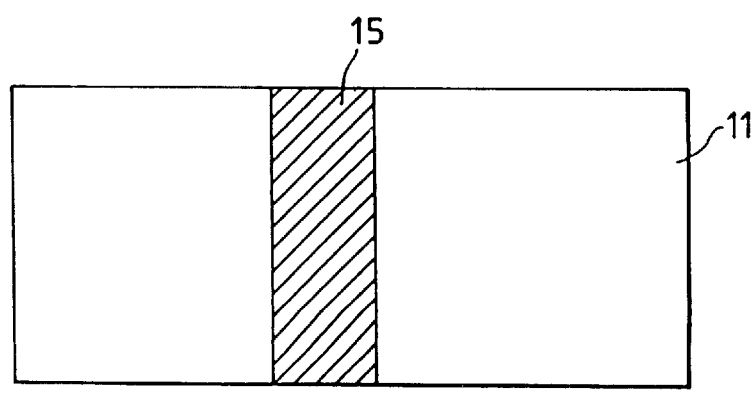

An electric discharge was forced to take place for 0.1 seconds in an helium gas atmosphere, separating the insulating layer and the tungsten block by 0.5 mm, and repeated for five times with an interval of 0.2 seconds. The area 15 shown in FIG. 6 of the insulating layer 11 that had been subjected to the electric discharges was examined for electric resistance by means of a tester to find out that it did not carry any electric current as before the experiment.

To the contrary, in an experiment where the insulating layer of a similar structured member solely made of alumina, or a non-recoverable type insulating material, was subjected to similar electric discharges for the purpose of comparison, it showed an electric resistance of about 1 kΩ after the discharges to prove a loss of electric resistance of the layer.

[Embodiment 2]

Figure 2:
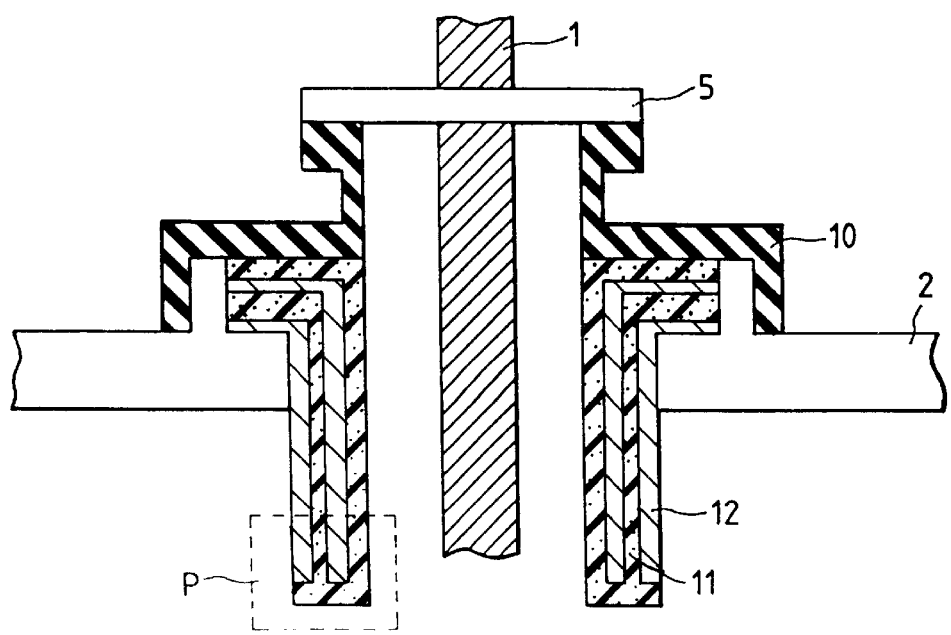

FIG. 2 schematically illustrates one of the areas of a second embodiment of superconducting apparatus where leads are secured to the apparatus. In FIG. 2, reference numeral 12 denotes a 2 mm thick conducting layer of stainless steel, on which an insulating layer of a mixture of $Y_2O_3$ and $Al_2O_3$ wherein the ratio of Al to Y is 100 to 20 is formed by flame coating. The structured member of FIG. 2 comprises two conducting layers 12, 12 and two insulating layers 11, 11 as well as a bottom layer of the same insulating mixture. Note that the stainless steel layers are held in contact with the cryogenic chamber 2. Since the structured members of this embodiment have an insulating bottom and the conducting layers are not exposed to the lead, it proves to have a high discharge initiating voltage.

Figure 7A:
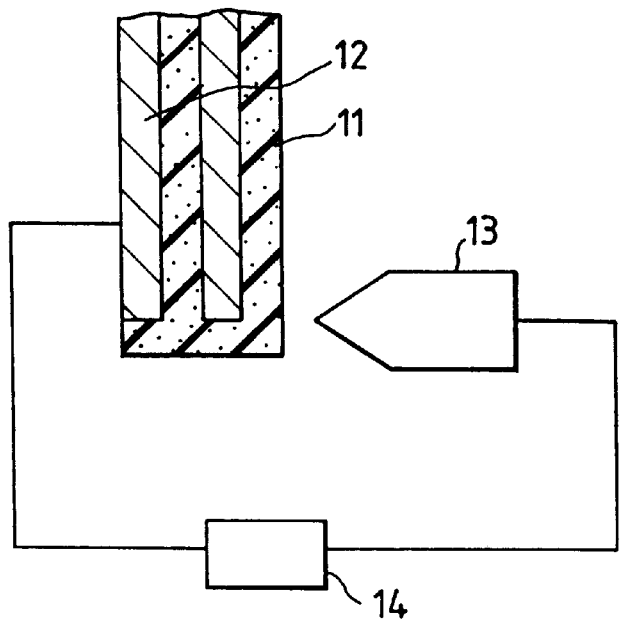
Figure 7B:
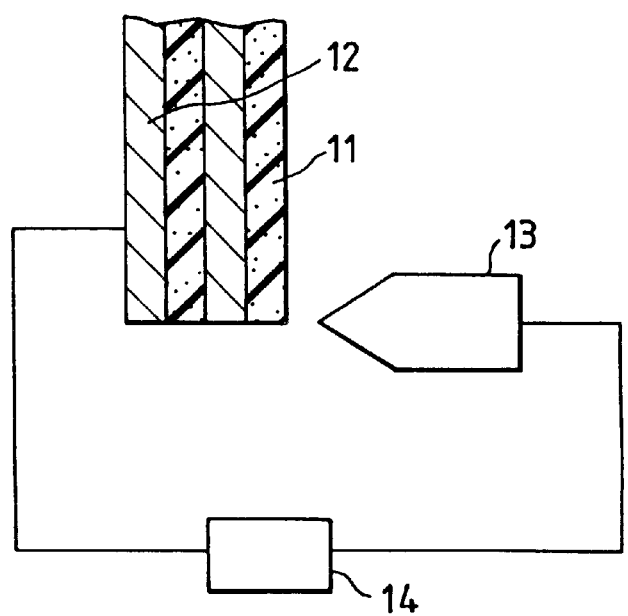

In an experiment, the effect of the structured member was examined by means of a gauging system as schematically illustrated in FIG. 7A particularly in terms of the discharge initiating voltage. Another structured member having a configuration similar to that of the member of FIG. 2 but did not have any insulating bottom layer was also prepared and tested with a gauging system as illustrated in FIG. 7B. In FIGS. 7A and 7B, reference numeral 13 denotes a tungsten block used as a discharge electrode and aligned with the bottom line of the stainless steel layers 12, 12. In the case of FIG. 7B, an electric discharge occurred at room temperature in an helium atmosphere when the tungsten block and the surface of the opposing insulating layer was separated from each other by 0.5 mm and a voltage of 3 kV was applied. Under the same condition, no electric discharge was observed until the applied voltage was raised to 5 kV.

[Embodiment 3]

Figure 3:
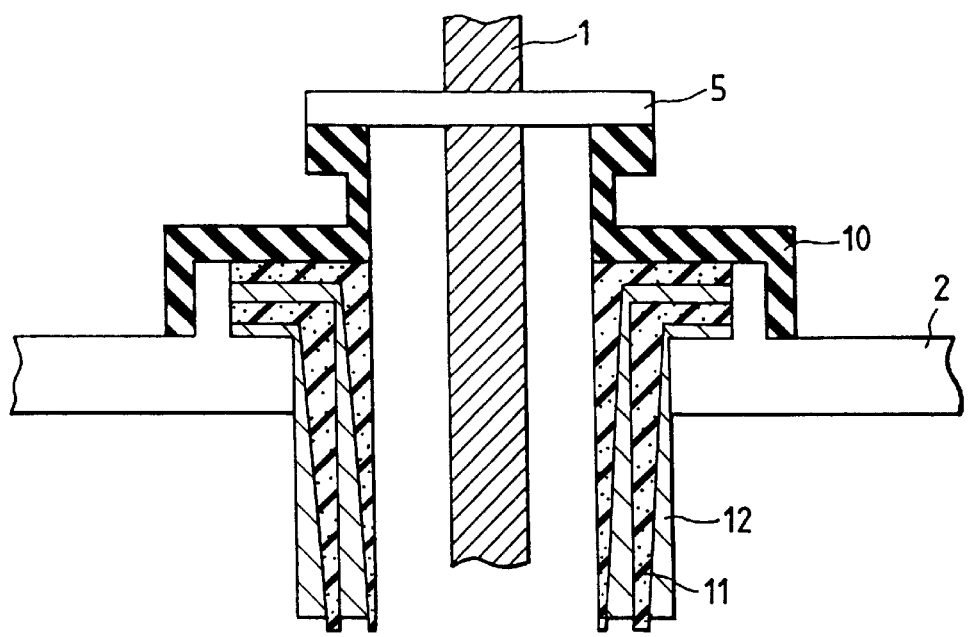

FIG. 3 schematically illustrates one of the areas of a third embodiment of a superconducting apparatus where leads are secured to the apparatus. The insulating material to be used for this embodiment is a mixture of $Y_2O_3$ and $Al_2O_3$ containing them at a ratio of 10 to 100 by weight. The structured member of FIG. 3 is prepared by pouring the above mixture into a flask mold in which a pair of conducting layers of copper that have been machined to given respective tapered profiles are arranged in position, compressing the mold by CIP until the layers come to show a cross sectional view as shown in FIG. 3 and then heat-treating them at 500° C. for five hours in the air. The insulating layers have a varying thickness of between 7 mm and 1 mm while the conducting layers shows a thickness varying between 3 mm and 1.5 mm.

In an experiment using a gauging system as schematically illustrated in FIG. 5, the effectiveness of a structured member comprising an insulating layer and a conducting layer was examined. Since the insulating and conducting layers had respective varying thicknesses, a varying voltage up to 30 kV was applied at a plurality of positions for a time period of between 0.05 and 0.1 seconds to generate five electric discharges with an interval of 0.3 seconds in order to find out any change in the electric resistance before and after the electric discharges. When gauged with a tester, no change was observed before and after the electric discharges.

The conducting layers of this embodiment have a varying thickness in order to shut off any external heat from intruding the apparatus. More specifically, since the electrically conducting material of the conducting layers is also a good thermal conductor, any heat in the cryogenic chamber can be transmitted to the vicinity of the superconducting equipment contained therein. If the superconducting equipment is relatively large and heat is transmitted therein, the consumption rate of the cooling agent of such an apparatus can remarkably rise. By tapering the conducting layers, external heat can be effectively prevented from entering the cryogenic chamber because the tapered sections of the conducting layers can be cooled easily to fend off any intrusion of external heat.

[Embodiment 4]

Figure 4:
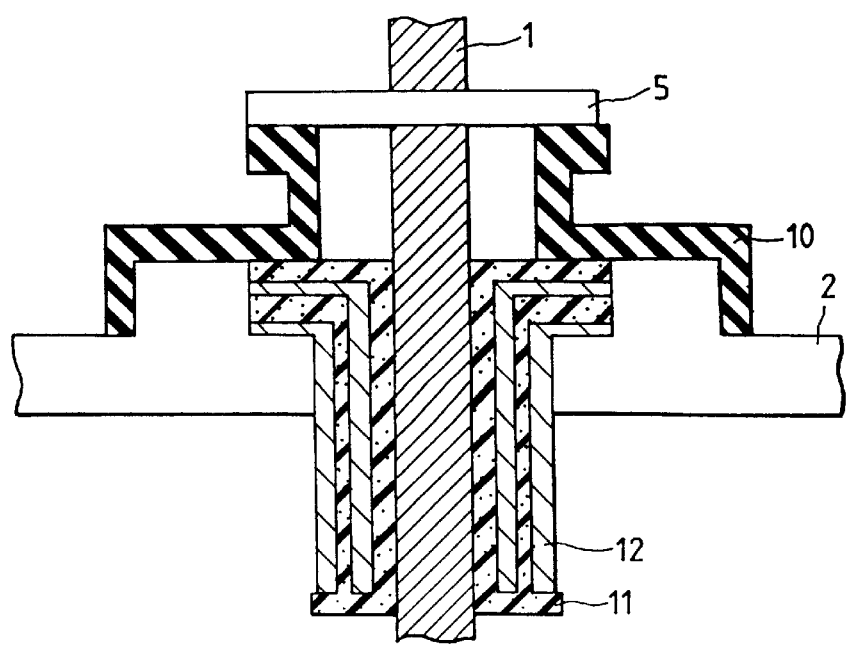

FIG. 4 schematically illustrates one of the areas of a fourth embodiment of superconducting apparatus where leads are secured to the apparatus. The structured member of FIG. 4 comprises insulating layers 11, 11 and conducting layers 12, 12 and is held in contact with the lead 1. While the structured member, the lead 1, the cryogenic chamber 2 and the fitting flange 10 may be integrally formed, they are prepared as separated components for this embodiment.

The conducting layers 12, 12 are made of a stainless steel plate. On each of the conducting layers 12, 12, $Al_2O_3$ is deposited by vacuum deposition and thereafter $Y_2O_3$ in the same manner. This process is then repeated to form a total of four $Y_2O_3$ layers, each having a thickness of 1 μm, and a total of five $Al_2O_3$ layers, each having a thickness of 1.5 μm, to produce an insulating layer 11 of a multilayer structure comprising layers of two different types arranged alternately. In this way, a structured member having a configuration as shown in FIG. 4 and comprising a pair of insulating layers 11, 11 and a pair of conducting layers 12, 12 as well as an insulating bottom is produced. The structured member is then heat-treated in an oxygen atmosphere.

In an experiment, a structured member of this embodiment and a comparable member realized by using only $Al_2O_3$ layer 11.5 μm in thickness for the insulating layers were tested for electric discharges by means of a gauging system as illustrated in FIG. 7. The laminate specimens were 25 mm wide and 50 mm long as in the case shown in FIG. 4, i.e., the experiment described above for Embodiment 2. While the specimen for comparison containing only $Al_2O_3$ for the insulating layers showed an electric resistance of about 700 Ω after electric discharges, the specimen of this embodiment did no carry any electric current after the experiment. When a specimen containing only $Y_2O_3$ for the insulating layers was also tested, it proved to have a discharge initiating voltage lower than that of the specimen of the embodiment by about 10 to 15% but allowed electric discharges to be generated at a rate as low as about 1/10,000 of the rate of generation of electric discharges of an apparatus without the structured members of this embodiment (which are replaced by copper plates).

[Embodiment 5]

FIG. 8 schematically illustrates one of the areas of a fifth embodiment of a superconducting apparatus where leads are secured to the apparatus. There are shown a lead 1, a fitting flange 5 for securing the lead 1 to the cryogenic chamber 2, an insulating flange 10, a lead wire 16 for connecting the lead 1 and the superconducting equipment (not shown), a cooling gas inlet port 17 for introducing evaporated gas in order to cool the lead 1 and a terminal for connecting the lead 1 and another lead wire 19 extending from an external power source (not shown).

The insulating layers 11, 11 of the structured member of this embodiment shown in FIG. 8 is made of a mixture of $Y_2O_3$ and $Al_2O_3$ containing at a ratio of 30 to 70. The structured member additionally comprises an oxide superconductor 12-1 and a silver plate 12-2. The structured member is prepared by placing a volume of powdery oxide to be used for the superconductor 12-1 and the silver-plate 12-2 in a given flask mold and compressed for molding until the molded member shows a cross sectional view of FIG. 8. Thereafter, the molded member is heat-treated at 550° C. for an hour in an oxygen atmosphere. The cooling gas inlet port was partly filled with layered meshy articles each prepared by coating meshed silver wires with a thin superconducting film of an oxide. While $Bi_2Sr_2Ca_2Cu_3O_y$ is a preferable superconducting oxide for this embodiment, any substance that is turned superconducting by means of an evaporated cooling agent may be used for the embodiment.

The structured member comprising insulating layers 11, an oxide superconductor 12-1 and a silver plate 12-2 is then secured to the flange 5 by way of the insulating flange 10. Apart from the grounding of the cryogenic chamber, the member is grounded by way of a lead wire 20 extending from the silver plate 12-2.

In an experiment using a gauging system as schematically illustrated in FIG. 5, the effectiveness of a structured member prepared in a manner as described above and arranged on a plate was tested for electric discharges. In the experiment, a varying voltage up to 20 kV was applied to the specimen to cause a total of five electric discharges to occur with an interval of 0.3 seconds, each lasting for a time period between 0.05 and 0.1 seconds, and the resulting change in the resistance was observed. For the experiment, the electrode 13 and the insulating layer 11 in FIG. 5 was separated by 0.2 mm and the electric discharges were caused to take place by cooling the oxide superconductor 12-1 by means of cooled helium gas. When observed for electric resistance by means of a tester, the specimen did not show any electric current before and after the electric discharges.

Figure 9:
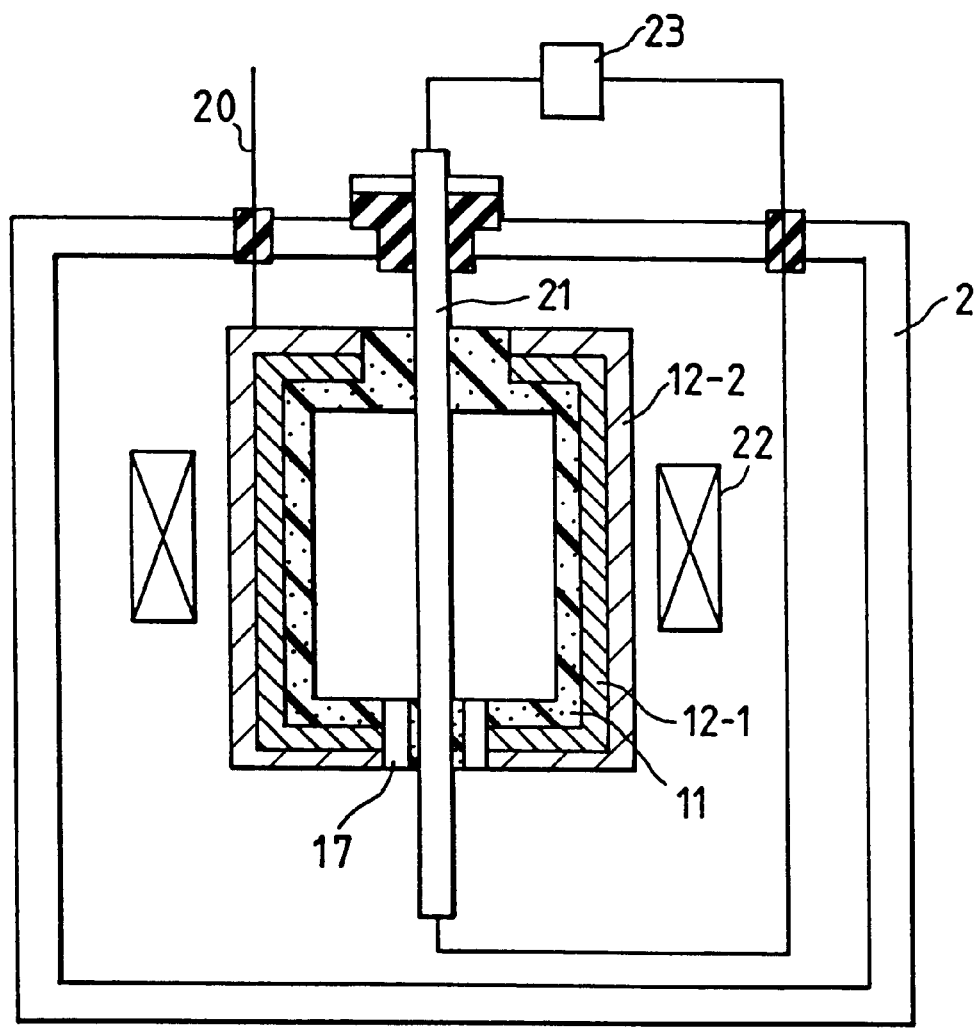

In another experiment, the magnetism shielding effect of a structured member of this embodiment was examined by using a gauging system of FIG. 9. In FIG. 9, reference numeral 21 denotes a rod shaped piece of $Bi_2Sr_2Ca_2Cu_3O_y$ with a diameter of 2 mm and reference numeral 22 denotes an electromagnet. The rod shaped oxide superconductor 21 was placed in liquid nitrogen to produce a superconducting state there and an electric current was made to flow therethrough by means of a power source 23. When the electromagnet was not operated, the superconductor 21 allowed an electric current to flow at a rate of 40,000 A/cm$^2$. When a specimen of a structured member of this embodiment was arranged as shown in FIG. 9 and cooled to about 10K, the superconductor 21 allowed an electric current to flow therethrough at a rate of 34,000 A/cm$^2$ even if an electric field of 1.0 tesla was applied thereto by the electromagnet. On the other hand, when a specimen of the structured member was not used, the rate of electric current that could be made to flow through the superconductor 21 was reduced to 1,500 A/cm$^2$ if an electric field of 0.05 tesla was applied thereto by the electromagnet.

The results of the experiments using the arrangements of FIGS. 5 and 9 evidence that a structured member of this embodiment is effective for the prevention of electric discharges near the lead and, at the same time, as a magnetic shield for external magnetic fields.

[Embodiment 6]

FIG. 10 schematically illustrates one of the areas of a sixth embodiment of the superconducting apparatus where leads are secured to the apparatus. Reference numeral 1 denotes a lead having a cross sectional view as shown in either FIG. 13A or 13B, where reference numeral 24 denotes a hollow tube of stainless steel and reference numeral 25 denotes an insulating layer arranged on the outer peripheral surface of the tube 24. Reference numeral 27 denotes an oxide superconductor formed dispersing $Bi_2Sr_2Ca_2Cu_3O_y$ into CaCuO. Reference numeral 7 denotes a layer covered by the oxide superconductor 27 in FIG. 13A and covering the oxide superconductor 27 in FIG. 13B, and made of materials selected from silver, silver alloy, copper, copper alloy, stainless steel, manganese alloy and other substances. While a combination of an oxide superconductor 27 and layer 7 forms a conductor contained in the lead, an intermediary layer of MgO may additionally be arranged between the oxide superconductor 27 and the layer 7. The lead contains a number of conductors. The conductors of the leads of this embodiment may have a configuration of FIG. 13A, that of FIG. 13B or a mixture thereof.

The conducting layer 12 of the structured member of FIG. 10 has a cylindrical shape and is formed by dispersing $Y_2BaCuO_z$ into superconducting oxide $YBa_2Cu_3O_x$ and then covering its outer surface with a coat of teflon resin 11 into which $Y_2O_3$ is dispersed by 5 wt %. The conducting layer 12 is grounded by way of an insulated lead wire 20 independent of the cryogenic chamber 2.

In an experiment, the effect of a structured member of this embodiment comprising insulating layers 11 and a conducting layer 12 was examined by applying an external magnetic field to a superconducting apparatus provided with above described structured members and a comparable apparatus not provided with structured members. The leads of the apparatuses allowed an electric current up to a rate of about 50,000 A/cm$^2$ when no electric field was externally applied thereto. The apparatus provided with structured members did not show any change in the rate of electric current when a magnetic field of 0.5 teslas was applied thereto, whereas the rate of electric current running through the apparatus having no structured members was reduced to 1,100 A/cm$^2$ when a magnetic field of 0.5 teslas was applied to it. Note that the structured members were cooled to about 15K in the experiment. The result indicates that the rate of electric current flowing the leads of a superconducting apparatus of the type under consideration not provided with structured members is significantly reduced to degrade the overall performance of the apparatus. Additionally, if the leads of such an apparatus are subjected to a fluctuating leaky magnetic field, the rate of electric current running through the leads also fluctuate to impair the stability and reliability of the apparatus.

Since the structured members of this embodiment are used in a superconductive state, any external magnetic fields can be effectively blocked by the Meissner effect. Additionally, since the structured members are in a superconductive state, any unnecessary electric charge stored in the conducting layer 12 is a discharged by way of the lead wire 20 which is also in a zero-resistance state.

[Embodiment 7]

Figure 11:
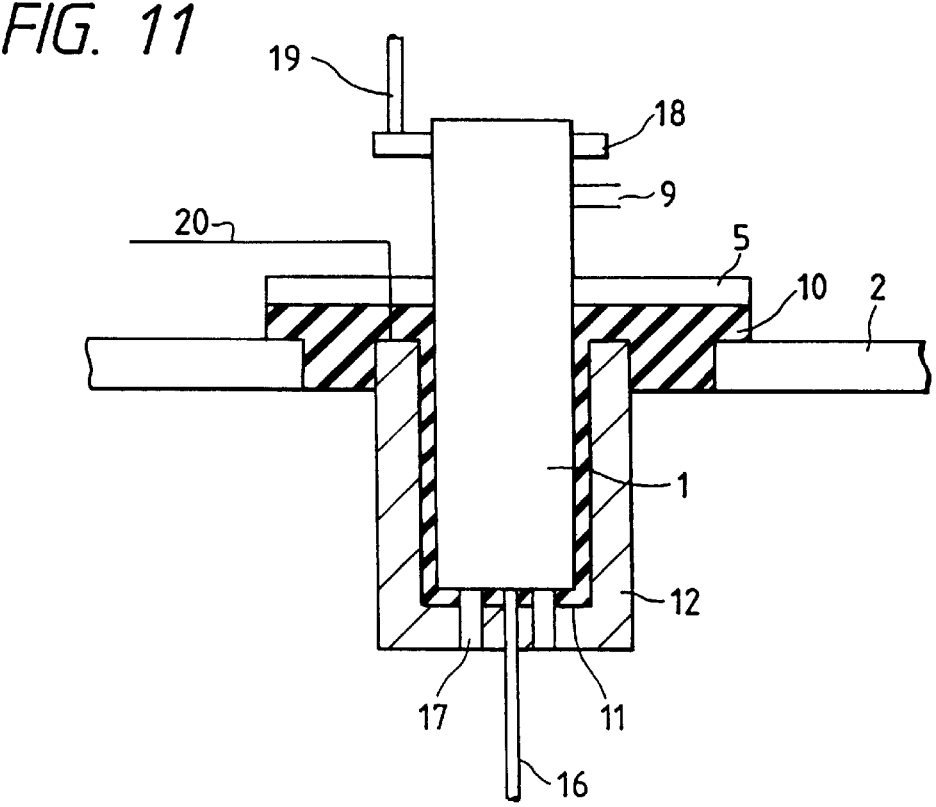

FIG. 11 schematically illustrates one of the areas of a seventh embodiment of superconducting apparatus where leads are secured to the apparatus. The materials used for the leads and the structured members are same as those of Embodiment 6. The conducting layer 12 of the structured member of FIG. 11 is coated with an insulating layer 11 of epoxy resin which takes the role of a fitting flange for securing the lead 1 to the cryogenic chamber 2 and that of an insulating flange interposed between the fitting flange and the cryogenic chamber of the preceding embodiments. In an experiment, it was proved that the leads of this embodiment allowed an electric current to flow at a rate of about 46,000 A/cm$^2$, which did not show any change when an external magnetic field of 0.5 teslas was applied if the structured members were kept as cold as lower than 50K. On the other hand, when the conducting layers 12 of the structured members were removed and an external magnetic field of 0.4 teslas was applied, the rate of electric current running through the leads fell to 1,200 A/cm$^2$.

[Embodiment 8]

Figure 12:
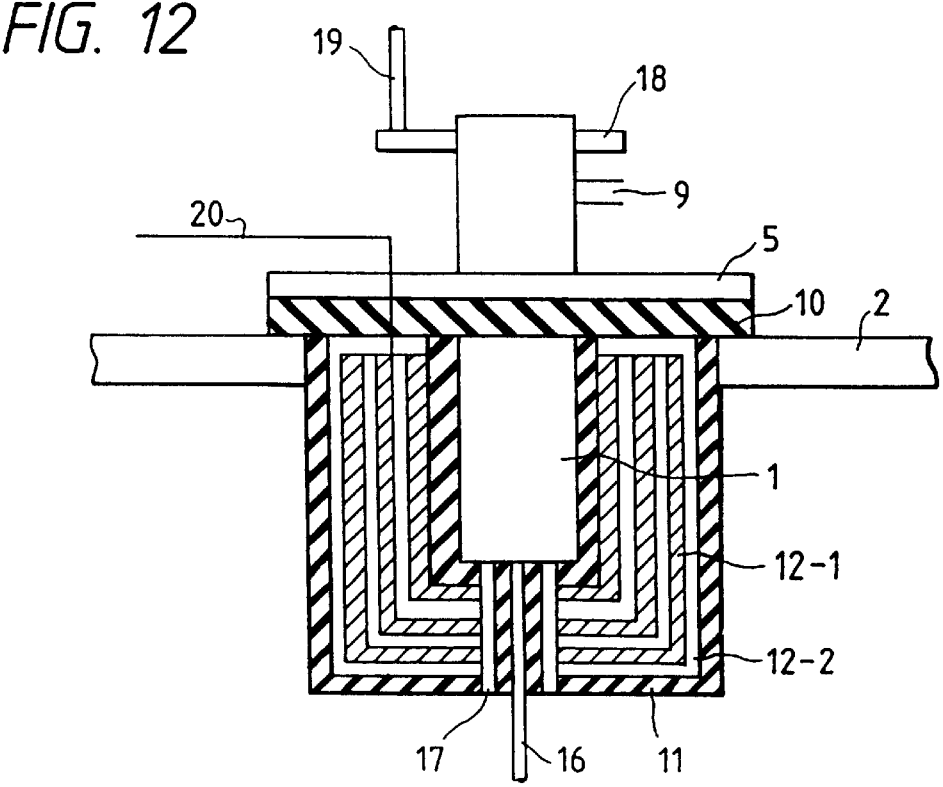

FIG. 12 schematically illustrates one of the areas of a eighth embodiment of the superconducting apparatus where leads are secured to the apparatus. The materials used for the leads and the structured members are same as those of Embodiment 7. Referring to FIG. 12, the structured member is prepared by arranging a pair of telescopically arranged hollow cylinders 12-2, 12-2 of permalloy, filling the gap between the cylinders with powder of a superconducting oxide 12-1 to form a three-layered structure, compressing the structure to produce a three-layered and molded article having a given profile and coating the article with an insulating layer 11. The insulating layer 11 is a sheet of a kneaded mixture of polyethylene and yttrium oxide mixed to a ratio of 100 to 5 by weight.

In an experiment, an electric current was caused to flow through the leads 1 at a rate of 50,000 A/cm$^2$ and an external magnetic field of 1 tesla was applied thereto by means of an electromagnet (not shown) to find that the electric current did not show any change. However, when a same current was caused to run through the leads of the embodiment at the same rate after removing the structured members and an external magnetic field of 1 tesla was applied thereto, the rate of electric current was reduced to as low as 100 A/cm$^2$.

[Embodiment 9]

This embodiment is similar to Embodiment 8 except that the leads 1 of Embodiment 8 are replaced by those having a cross sectional view as shown in FIG. 14. Referring to FIG. 14, the lead comprises a number of hollow aluminum tubes 8, 8, . . . , 8, each of which is surrounded by a plurality of oxide superconductors 27. The conductors 27, 27, . . . , 27 may alternatively be so many composite conductors constituted by components 7 and 27 as shown in FIG. 13A or 13B. The use of composite conductors provides an advantage that any mechanically deformed conductors that are transmitting electricity can be detected. If any of the conductors comprising an oxide superconductor has a structurally defective portion for some reason, that portion generates heat once energized because of the current density is inevitably reduced at that portion to consequently deform the aluminum tube at that portion by heat. Since the aluminum tube contains a light transmitting member in it and allows light to pass therethrough, a deformed portion of the aluminum tube is accompanied by corresponding deformation in the light transmitting member. Such mechanical deformation on the part of the light transmitting member can also be given rise to when the current density of the conductor is changed by external noise.

Thus, if there is a mechanically deformed aluminum tube within a lead of an apparatus according to the invention, it can be detected with an enhanced accuracy by introducing external light into the tube and sensing any change in the reflected or transmitted light. Mechanical deformation on the part of a conductor of a lead of a superconducting apparatus of the type under consideration can often result in a disrupted conductor. However, the embodiment is effective for detecting mechanical deformation in any conductors in early stages of deformation and therefore the adverse effect of such deformation can be minimized to ensure the stable operation of the apparatus by temporarily reducing the rate of electric current or cooling the deformed conductor by all means.

The aluminum tubes 8, 8, . . . , 8 of this embodiment may be replaced tubes made of a shape-memory alloy, quartz glass, polyimide resin or some other Additionally, light was injected into one of the tubes 8, 8, . . . , 8 from an end thereof while the embodiment was without the structured members and the intensity of transmitted light was measured at the other end by means of an optical detector. The intensity of transmitted light was reduced by 20 to 30% when an external magnetic field was applied to the tube for about 0.1 seconds. When the rate of electric current running through the leads was reduced to 80 A/cm$^2$ and the temperature of the conductors was restored to the level before the application of the magnetic field, the transmissivity regained about 98% of the original value. This means that, as the electric field was applied, the current density in the conductors was reduced and the conductors were made to emit heat to mechanically deform the tubes 8, 8, . . . , 8 but the conductors restored the original shape as the rate of electric current was reduced to lower the temperature. Thus, the use of structure members and tubes 8, 8, . . . , 8 as in the case of this embodiment is effective in detecting abnormal conditions such as quenched conductors.

[Advantages of the Invention]

As described above in detail, since a superconducting apparatus according to the invention comprises structured laminate members made of at least a material selected from superconductive substances and material that transmits light introduced therein at an end to the other end to a detectable extent. It may be so arranged that light is simply transmitted through the hollow tube or reflected by the wall of the hollow tube while it is transmitted therethrough. Still alternatively, it may be so arranged that light passes through a waveguide of a multilayer structure having layers with different refractive indexes. For the purpose of the invention, the material to be selected for light transmission may well have a transmissivity of at least 1%. While each of the tubes 8, 8, . . . , 8 of FIG. 14 carries eight superconductors 27, 27, 27, the moving of superconductors to be carried by a single tube is not limited and the superconductors may be used with a conductive material such as copper. The topology of the combined tube and superconductors is not limited to that of FIG. 14 so long as the superconductors are held in contact with the tube.

In an experiment, when an electric current was made to run through the leads 1 of the embodiment at a rate of 47,000 A/cm$^2$ and an external magnetic field of 1 tesla was applied thereto, no change in the rate of electric current was observed. However, when tested with the embodiment from which the structured members had been removed and to which an external magnetic field of 1 tesla was applied, the rate of electric current was reduced to as low as 80 A/cm$^2$. magnetic substances and a recoverable type insulating material is used for electric insulation of the apparatus, the probability of occurrence of electric discharges in areas surrounding the leads of the apparatus is significantly reduced and, if electric discharges occur, the insulation of the apparatus is restored as soon as the discharges are over. With such an arrangement, therefore, the apparatus can be down-sized and the frequency of replacement of parts can be remarkably reduced. Additionally, the leads are protected from various noises including leaky magnetic fields by the structured members. Finally, since a light transmitting material is used for the conductors of the apparatus, abnormal conditions on the part of the conductors can be detected by optical means that are not affected by electromagnetic noises.

What is claimed is:

1. A superconducting apparatus comprising:

a cryogenic chamber;

superconductive equipment contained in said cryogenic chamber;

a lead secured to said cryogenic chamber and connected to said superconducting equipment; and a structured member for preventing an electric discharge provided between said lead and an area for securing said lead to said cryogenic chamber, wherein said structured member is a laminate of a conducting layer and an insulating layer, with said insulating layer containing a recoverable-type insulating material and nonrecoverable-type insulating material.

2. A superconducting apparatus according to claim 1, wherein said insulating layer contains a mixture comprised of said recoverable type insulating material and said non-recoverable type insulating material.

3. A superconducting apparatus according to claim 1, wherein said insulating layer contains a laminate comprised of a layer of said recoverable type insulating material and a layer of said non-recoverable type insulating material.

4. A superconducting apparatus according to claim 1, wherein said structured member has at least two conducting layers and two insulating layers.

5. A superconducting apparatus according to claim 1, wherein said insulating layer is disposed close to said corresponding lead and said conducting layer is disposed close to the area of said cryogenic chamber for receiving said lead.

6. A superconducting apparatus according to claim 1, wherein said conducting layer of the structured member is held to an electric potential equal to that of said cryogenic chamber.

7. A superconducting apparatus according to claim 1, wherein said conducting layer of said structured chamber is grounded.

8. A superconducting apparatus according to claim 1, wherein said conducting layer of said structured member has a predetermined profile.

9. A superconducting apparatus according to claim 1, wherein said structured member has an effect of shielding said corresponding lead from electromagnetic noises.

10. A superconducting apparatus according to claim 9, wherein said conducting layer of said structured member contains a magnetic substance.

11. A superconducting apparatus according to claim 9, wherein said conducting layer of said structured member contains a superconductive material.

* * * * *

UNITED STATES PATENT AND TRADEMARK OFFICE
CERTIFICATE OF CORRECTION

PATENT NO. : 6,342,672 B1
DATED : January 29, 2002
INVENTOR(S) : Norio Kaneko et al.

It is certified that error appears in the above-identified patent and that said Letters Patent is hereby corrected as shown below:

Title page,
Item [56], References Cited, FOREIGN PATENT DOCUMENTS,
"2237413 -- 2-237413
3283678      should      3-283678
4320305       read       4-320305
4369875"                 4-369875 --.

Column 3,
Line 48, "led" should read -- lead --.

Column 10,
Lines 31, 34 and 66, "teslas" should read -- tesla --.

Column 11,
Line 3, "teslas" should read -- tesla --.

Column 12,
Line 3, "other Additionally," should read -- other material that transmits light introduced therein at an end to the other end to a detectable extent. It may be so arranged that light is simply transmitted through the hollow tube or reflected by the wall of the hollow tube while it is transmitted therethrough. Still alternatively, it may be so arranged that light passes through a waveguide of a multilayer structure having layers with different refractive indexes. For purpose of the invention, the material to be selected for light transmission may well have a transmissivity of at least 1 %. While each of the tubes 8, 8, ..., 8 of Fig. 14 carries eight superconductors 27, 27, ..., 27, the moving of superconductors to be carried by a single tube is not limited and the superconductors may be used with a conductive material such as copper. The topology of the combined tube and superconductors is not limited to that of Fig. 14 so long as the superconductors are held in contact with the tube.
     In an experiment, when an electric current was made to run through the leads 1 of the embodiment at a rate of 47,000 $A/cm^2$ and an external magnetic field of 1 tesla was applied thereto, no change in the rate of electric current was observed. However, when tested with the embodiment from which the structured members had been removed and to which an external magnetic field of 1 tesla was applied, the rate of electric current was reduced to as low as 80 $A/cm^2$. Additionally, --.
Line 27, "material that transmits light" should be deleted.
Lines 28-52, should be deleted.

UNITED STATES PATENT AND TRADEMARK OFFICE
CERTIFICATE OF CORRECTION

PATENT NO.   : 6,342,672 B1
DATED        : January 29, 2002
INVENTOR(S)  : Norio Kaneko et al.

It is certified that error appears in the above-identified patent and that said Letters Patent is hereby corrected as shown below:

<u>Column 14,</u>
Line 10, "chamber" should read -- member --.

Signed and Sealed this

Twenty-second Day of October, 2002

Attest:

Attesting Officer

JAMES E. ROGAN
*Director of the United States Patent and Trademark Office*